PROCESS FOR FORMING SILICON DIOXIDE FILMS
Filed April 4, 1968
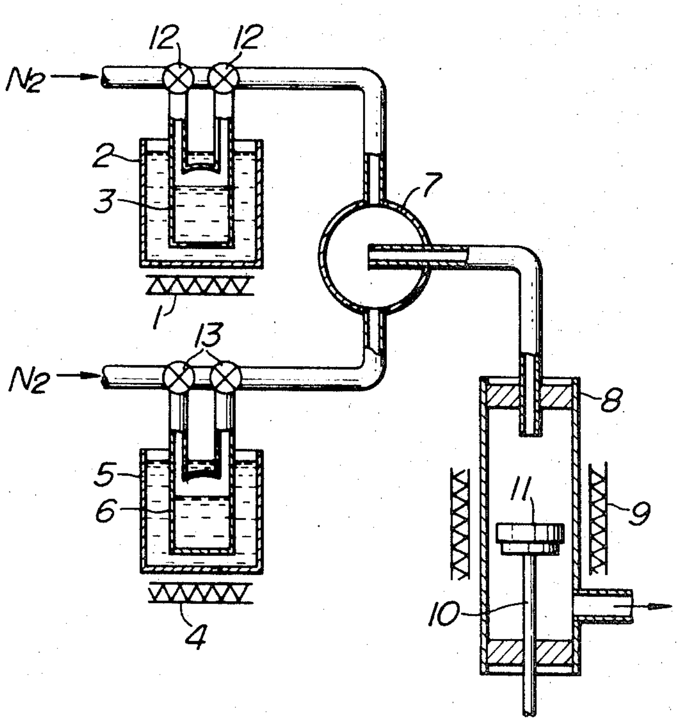
INVENTORS
HITOO IWASA
MASAMI YOKOZAWA
IWAO TERAMOTO
BY Stevens, Davis, Miller & Mosher
ATTORNEYS

United States Patent Office 3,556,841

Patented Jan. 19, 1971

3,556,841

PROCESS FOR FORMING SILICON DIOXIDE FILMS

Hitoo Iwasa, Toyonaka-shi, Masami Yokozawa, Osaka, and Iwao Teramoto, Ibaragi-shi, Japan, assignors to Matsushita Electronics Corporation, Osaka, Japan, a corporation of Japan Filed Apr. 4, 1968, Ser. No. 718,896

Claims priority, application Japan, Apr. 11, 1967, 42/23,773

Int. Cl. C23c *11/08*

U.S. Cl. 117—201 10 Claims

ABSTRACT OF THE DISCLOSURE

Silicon dioxide film is formed on the surface of a semi-conductor substrate by the thermal decomposition of a mixed gas comprising a vapor of an organo-oxysilane, a vapor of an aliphatic carboxylic acid, such as acetic acid, and an inert gas. The use of said mixed gas results in such advantages that the reaction can proceed at such a low temperature within the range of 300° to 600° C. and the variation in characteristic of silicon dioxide at the deposition step can be reduced.

The accompanying drawing is a rough sketch showing an example of apparatuses for practicing the present process for forming silicon dioxide films.

This invention relates to a process for chemically forming silicon dioxide films by the pyrolysis of organio-oxysilanes.

For the formation of a silicon dioxide film, there has heretofore been known a process in which an organo-oxysilane such as tetraethoxysilane or ethyltriethoxysilane is thermally decomposed in a nitrogen or argon atmosphere maintained at 700° to 800° C., thereby depositing silicon dioxide onto the surface of a semi-conductor. In order to form a silicon dioxide film sufficient as an insulator for semi-conductor devices according to the above procss, it is necessary to maintain the deposition temperature at 700° to 800° C. Accordingly, the said process has been greatly restricted in substrate materials to be used. For example, there has been such a problem that the above process is not applicable to low melting semi-conductors such as indium-antimony compound or to semi-conductor devices using as a substrate a so-called high vapor pressure substance such as galium arsenide which is liable to be thermally decomposed at an elevated temperature.

Further, there has also been known a process in which, according to the pyrolysis of an organo-oxysilane, a silicon dioxide film is formed at such a low temperature as 300° to 600° C. by incorporating oxygen into the aforesaid atmosphere thereby promoting the thermal decomposition of the organo-oxysilane. According to the above process, however, oxygen is contained in the atmosphere, so that the process cannot be applied to a readily oxidizable substrate such as, for example, germanium, and, in practice, the application thereof has been limited to the case where silicon is used as a substrate material. Further, if an organo-oxysilane is thermally decomposed in an oxygen-containing atmosphere, a combustible gas such as ethanol ($C_2H_5OH$) or ethylene ($C_2H_4$) is formed as a decomposition product in the reactor. Consequently, a danger of ignition or explosion is extremely great, and a process, carried out by increasing the amount of incorporated oxygen to promote the thermal decomposition of organo-oxysilane thereby elevating the formation rate of silicon dioxide, has accompanied a great danger.

The present invention has eliminated the above drawbacks encountered in the pyrolysis of organo-oxysilanes.

A characteristic of the present invention resides in a process for depositing silicon dioxide on the surface of a substrate by thermally decomposing an organo-oxysilane in nitrogen or argon in which a vapor of an aliphatic carboxylic acid such as acetic or propionic acid is added to said reaction gas to form silicon dioxide at such a low temperature as 300° to 600° C. by a reaction of, for example, $$Si(OC_2H_5)_4+4CH_3COOH \rightarrow SiO_2+4CH_3COOC_2H_5+2H_2O$$

In the present invention, preferable as such aliphatic carboxylic acids are those which are relatively high in vapor pressure such as, for example, acetic and propionic acids. Even in the case where other aliphatic carboxylic acids relatively low in vapor pressure, such as butyric and valeric acids, are used, the persent process is somewhat higher in formation rate of silicon dioxide than the conventional process, though the effect thereof is low. This is considered ascribable to the difference in vapor pressure of said aliphatic carboxylic acids. Accordingly, if an aliphatic carboxylic acid low in vapor pressure is elevated in vapor pressure by heating, there is attained the same effect as in the case of an aliphatic carboxylic acid relatively high in vapor pressure. In this case, however, the structure of apparatus to be employed is necessarily made complex, and therefore when the process is carried out on commercial scale, the use of such acid is not so preferable as compared with the case of acetic acid.

The present process is explained below with reference to the accompanying drawing.

The drawing is a block diagram showing an example of apparatus to be used for practicing the present process. In the drawing, an inert gas such as nitrogen or argon is introduced from one side of the apparatus into an evaporator 3 charged with an organo-oxysilane which has been maintained at a constant vapor pressure by means of a thermostat 2 provided with a heater 1, for example, and the inert gas is mixed with organo-oxysilane vapor. From the other side of the apparatus, an inert gas such as nitrogen or argon is introduced into an evaporator 6 charged with an aliphatic carboxylic acid, e.g. acetic acid, which has maintained at a constant vapor pressure by means of a thermostat 5 provided with a heater 4, for example, and the inert gas is thoroughly mixed with acetic acid vapor.

The two kinds of mixed gases, obtained in the above manner by individually mixing organo-oxysilane vapor and acetic acid vapor with an inert gas such as nitrogen or argon, are thoroughly mixed together in a gate mixer 7 to prepare a reaction gas containing organo-oxysilane and acetic acid. Subsequently, the reaction gas is nitroduced into a reactor 8, and a silicon dioxide film is fomed, by reaction of organo-oxysilane with acetic acid, on the surface of a semi-conductor substrate 11 placed on a hot plate 10, which has been heated to a given temperature of from 300° to 600° C. by means of a heater 9 such as a high-frequency furnace or heaters, an infrared lamp heater or a resistance heater. In the drawing, 12 and 13 are cocks for controlling the flow rate of inert gas.

In the present invention, in case tetraethoxysilane is used as the organo-oxysilane, the molar ratio of acetic acid to said tetraethoxysilane is optionally variable within the range of from 0.5–5:1. Particularly when the above ratio is from 2–4:1, the growth rate of silicon dioxide at a reaction temperature of 600° C. increases as much as 5 times the growth rate attained in the case where no acetic acid has been added. Even when propionic acid is used in place of acetic acid, the same effect as above can be attained.

If the reaction temperature is above 600° C., the growth rate of silicon dioxide film relies upon the thermal decomposition rate of organo-oxysilane, and the effect of acetic acid or the like contributing to the acceleration of reaction is markedly reduced. On the other hand, if the reaction temperature is such a low temperature as below 300° C., the growth rate of silicon dioxide film is low, and therefore the adoption of such a temperature is not preferable for commercial purpose.

As stated above, in accordance with the present invention, a silicon dioxide film can be formed on the surface of a semi-conductor substrate in an atmosphere containing no oxygen and at such a low temperature as 300° to 600° C., and therefore the invention is scarcely restricted in substrate materials employed. According to the present invention, therefore, silicon dioxide film can be adhered onto not only the surface of a silicon substrate but also the surface of such a substrate as, for example, a semi-conductor readily oxidizable on the surface, such as germanium, a low melting semi-conductor such as an indium-antimony compound, and a material readily decomposable at elevated temperatures, such as gallium arsenide.

Further, in practicing the present process, the temperatures for heating the reaction gas and substrate may be such low temperatures ranging from 300° to 600° C., and therefore there are brought about such commercial advantage that heaters using infrared lamps can be effectively utilized.

In the present invention, the substrate materials are not limited only to such semi-conductors as mentioned above, but any materials may be used so far as they are solids which do not change in quality even when heated to temperatures of 300°–600° C.

The following examples illustrate the invention.

EXAMPLE 1

Nitrogen as a carrier gas was introduced at rates of 200 cc. and 300 cc. per minute, respectively, into a tetraethoxysilane-charged evaporator maintained at 70° C. and a glacial acetic acid-charged evaporator maintained at 50° C. to obtain 2 kinds of mixtures of tetraethoxysilane vapor with nitrogen and of acetic acid vapor with nitrogen. These two mixed gases were sent to a gas mixer and were thoroughly mixed together to obtain a reaction gas comprising tetraethoxysilane, acetic acid and nitrogen. Subsequently, the reaction gas was introduced into a reactor to cause the reaction:

$$Si(OC_2H_5)_4+4CH_3COOH \rightarrow SiO_2+4CH_3COOC_2H_5+2H_2O$$

on the surface of a silicon substrate, which had been heated to 440° C. by means of a heater using infrared lamps, whereby a silicon dioxide film was formed at a growth rate of 0.11 micron per hour. The thus formed silicon dioxide film was substantially equal in quality to a silicon dioxide film obtained according to a conventional process by thermally decomposing tetraethoxysilane in a nitrogen atmosphere at 650° C.

The same result as above was obtained when, in the above example, germanium (Ge), indium-antimony (InSb) and indium arsenide (InAs) were used in place of the silicon substrate.

EXAMPLE 2

According to the same procedures as in Example 1, propionic acid was used in place of glacial acetic acid and a silicon substrate was heated to 520° C. to grow a silicon dioxide film on the surface of said silicon substrate. In this case, the growth rate of silicon dioxide film was 0.3 micron per hour, and the properties of the film were the same as in the case of Example 1.

EXAMPLE 3

According to the same procedures as in Example 1, nitrogen was introduced at flow rates of 200 cc. and 300 cc. per minute, respectively, into a tetraethoxysilane-charged evaporator maintained at 70° C. and a glacial acetic acid-charged evaporator maintained at 40° C., to form a reaction gas comprising tetraethoxysilane vapor, acetic acid vapor and nitrogen. This reaction gas was introduced into a reactor and was decomposed on a silicon substrate maintained at 520° C. by means of a heater using infrared lamps to form a silicon dioxide film at a growth rate of 0.5 micron per hour. Subsequently, the thus formed silicon dioxide film was subjected to densifying treatment carried out by heating the film in a nitrogen atmosphere at 800° C. for about 1 hour. The film thus treated had a refractive index of 1.45 and a density of 2.23, and was identical in quality with a silicon dioxide film formed by an ordinary thermal oxidation process.

As illustrated above, according to the present process, silicon dioxide films can be formed by thermally decomposing organo-oxysilanes at low temperatures. Further, the present process is effected at low temperatures, and hence has such advantage that solid substrates to be employed are not substantially restricted in kind. Moreover, the apparatus for practicing the present process is simple in structure and is easy in handling. Thus, the present invention is great in industrial values.

What is claimed is:

1. A process for forming silicon dioxide films, characterized in that a reaction gas is formed by mixing together a vapor of an organo-oxysilane selected from the group consisting of tetraethoxysilane and ethyltriethoxysilane, a vapor of an aliphatic carboxylic acid selected from the group consisting of acetic acid, propionic acid, butyric acid, and valeric acid, and an inert gas, and applying the reaction gas onto the surface of a substrate heated to and maintained at a temperature within the range of from 300° C. to 600° C., thereby depositing silicon dioxide on the surface of the substrate.

2. A process according to claim 1, wherein the organo-oxysilane employed is tetraethoxysilane or ethyltriethoxysilane.

3. A process according to claim 1, wherein the aliphatic carboxylic acid employed is acetic, propionic, butyric or valeric acid.

4. A process according to claim 1, wherein the substrate employed is silicon, germanium gallium-arsenide indium-antimony compound, gallium arsenide or indium arsenide.

5. A process according to claim 1, wherein the inert gas employed is nitrogen or argon.

6. A process according to claim 1 wherein said aliphatic carboxylic acid is acetic acid.

7. A process according to claim 1 wherein said organo-oxysilane is tetraethoxysilane.

8. A process according to claim 1 wherein said inert gas is nitrogen.

9. A process according to claim 1 wherein said substrate is silicon.

10. A process according to claim 1 wherein said aliphatic carboxylic acid is propionic acid.

References Cited

UNITED STATES PATENTS

| | | | |
|---|---|---|---|
| 3,200,019 | 8/1965 | Scott, Jr. et al. | 117—106X |
| 3,114,663 | 12/1963 | Klerer | 117—201X |
| 3,089,793 | 5/1963 | Jordan | 117—106X |
| 2,938,772 | 5/1960 | Enk | 117—106 |

ALFRED L. LEAVITT, Primary Examiner

A. GRIMALDI, Assistant Examiner

U.S. Cl. X.R.

117—106; 317—235